US006387308B1

(12) United States Patent
Kofahl

(10) Patent No.: US 6,387,308 B1

(45) Date of Patent: May 14, 2002

(54) SIMPLIFIED APPARATUS FOR FORMING BUILDING BLOCKS

(75) Inventor: Joachim Kofahl, Boksburg (ZA)

(73) Assignee: Hydraforms Developments (Pty) Ltd., Johannesburg (ZA)

(*) Notice: Subject to any disclaimer, the term of this patent is extended or adjusted under 35 U.S.C. 154(b) by 1159 days.

(21) Appl. No.: 08/821,711

(22) Filed: Mar. 19, 1997

Related U.S. Application Data

(62) Division of application No. 08/397,630, filed on Mar. 1, 1995, now abandoned.

(51) Int. Cl.[7] .............................................. B29C 43/14

(52) U.S. Cl. ...................... 264/119; 264/296; 425/416; 425/422; 425/444

(58) Field of Search ................................ 264/119, 293, 264/296; 425/218, 416, 422, 444

(56) References Cited

U.S. PATENT DOCUMENTS

| | | | | |
|---|---|---|---|---|
| 73,610 A | * | 1/1868 | Jordon | 425/416 |
| 113,300 A | * | 4/1871 | Hutchinson | 425/416 |
| 1,253,405 A | * | 1/1918 | McNeil | 425/416 |
| 1,371,656 A | * | 3/1921 | Whitney | 425/416 |
| 1,822,939 A | * | 9/1931 | Stout | 425/416 |
| 2,818,603 A | * | 1/1958 | Dunbar | 425/416 |
| 2,962,788 A | * | 12/1960 | Ramirez | 425/416 |
| 3,129,464 A | * | 4/1964 | Heider | 425/416 |
| 4,406,606 A | * | 9/1983 | Sangree | 425/416 |
| 5,277,570 A | * | 1/1994 | Siggers | 425/444 |

FOREIGN PATENT DOCUMENTS

| | | | | |
|---|---|---|---|---|
| FR | 401828 | * | 9/1909 | 425/416 |
| GB | 119206 | | 9/1918 | |
| GB | 138044 | | 1/1920 | |
| GB | 152784 | | 10/1920 | |
| GB | 273445 | | 7/1927 | |
| GB | 1 367 215 | | 9/1974 | |

* cited by examiner

*Primary Examiner*—C. Scott Bushey

(74) *Attorney, Agent, or Firm*—Townsend and Townsend and Crew LLP

(57) ABSTRACT

Apparatus for forming building blocks includes an upright compression chamber with an upper end which serves both as an inlet and an outlet. A sliding gate closes the inlet/output. A soil/cement mixture is loaded into the upper end of the compressing chamber, the gate is slide shut, and a ram then compresses the mixture against the gate. The gate is opened while the ram is still under pressure, smoothing the upper end of the block, and allowing it to be ejected through the common inlet/outlet.

7 Claims, 2 Drawing Sheets

SIMPLIFIED APPARATUS FOR FORMING BUILDING BLOCKS

This is a Division of application No. 08/397,630, filed Mar. 1, 1995 now abandoned, the disclosure of which is incorporated by reference.

BACKGROUND OF THE INVENTION

This invention relates to apparatus for forming blocks such as building blocks.

Various different machines for forming building blocks are known. Some of these machines use a hydraulic ram to compress a soil/cement mixture in a compression chamber to form a building block. Other machines use non-hydraulic mechanisms to compress the soil/cement mixture.

Although the hydraulic machines are usually relatively quick in operation, they are relatively complicated and expensive. On the other hand, although mechanical machines may be relatively inexpensive and simple to manufacture, their throughput is substantially less.

It is an object of the invention to provide an alternative apparatus for forming building blocks.

SUMMARY OF THE INVENTION

According to the invention apparatus for forming blocks comprises:

- an upright compression chamber having first and second opposed ends, with a common inlet and outlet at the first, upper and thereof;
- a ram movable between an extended position in which is extends into the compression chamber towards the first end thereof, and a retracted position towards the second end thereof; and
- a gate slidable transversely relative to the axis of travel of the ram to close off the common inlet and outlet of the compression chamber, so that the compression chamber can be filled with particulate material to be compressed and a block formed therefrom can be ejected via the common inlet and outlet.

The ram may be arranged to be driven by a first hydraulic cylinder disposed below the second end of the compression chamber.

The gate is preferably arranged to be driven by a second hydraulic cylinder disposed adjacent to the first end of the compression chamber.

The gate may comprise a plate having an inner surface defining an end wall of the compression chamber and being slidable in grooves or channels at the first end of the compression chamber.

Preferably, the ram is arranged to apply force to the particulate material in the compression chamber while the gate is opened after compression of the particulate material.

The inner surface of the plate is preferably formed with inclined shoulders at opposed edges thereof, so that sliding movement of the gate forms opposed bevelled edges on the adjacent end surface of a building block in the compression chamber.

The outer surface of the ram preferably has inclined shoulders at opposed edges thereof, so that if forms opposed bevelled edges on the adjacent and surface of a building block in the compression chamber.

The compression chamber may be supported on a free-standing frame.

The frame may include at least one lifting formation engageable by conventional lifting means such as a hydraulic boom.

Wheels may be fitted to the frame to allow towing of the apparatus.

The frame may support a hydraulic pump which is arranged to be driven from the power take-off of a tractor or another power source.

DESCRIPTION OF AN EMBODIMENT

Figure 3:
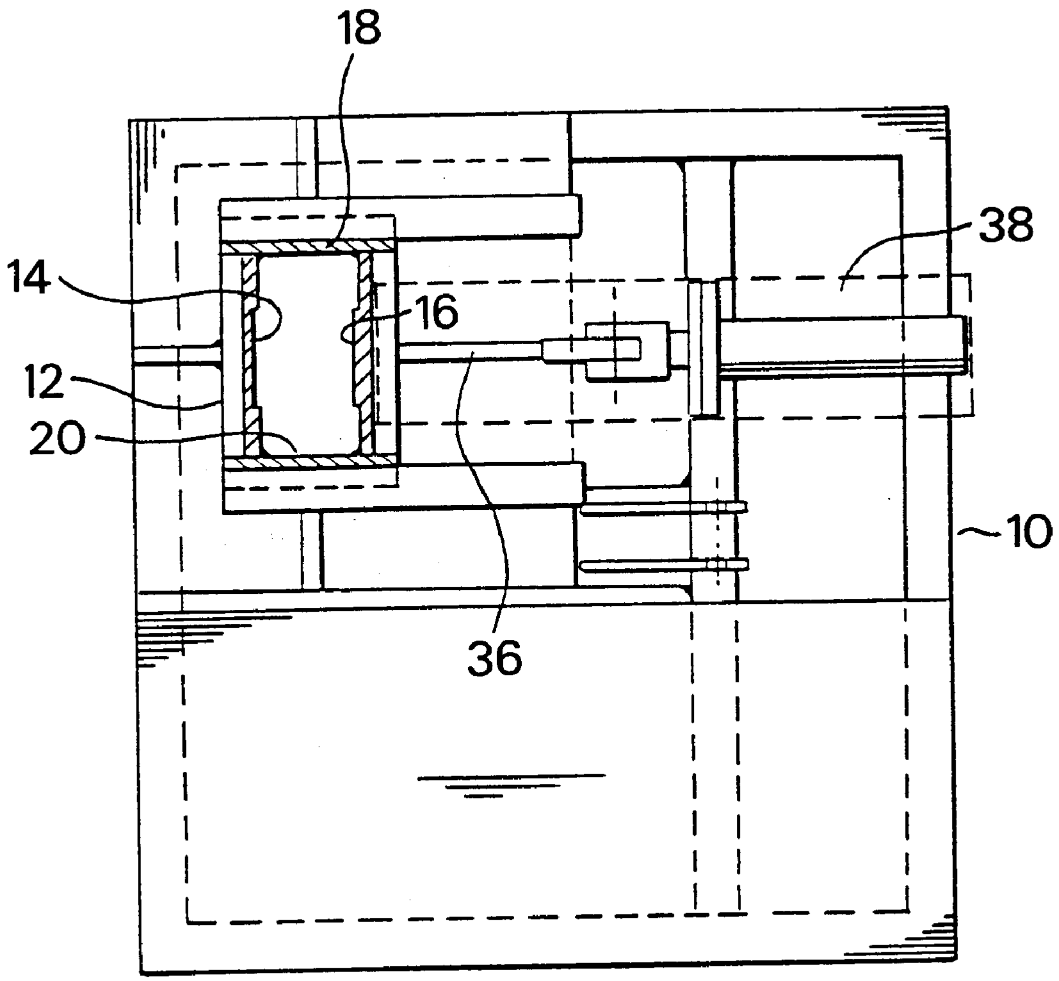
FIG. 3 a partial sectional plan view of the apparatus of FIGS. 1 and 2.

The illustrated apparatus comprises a frame 10 built from the steel channel sections which support at upright compression chamber 12 constructed from steel plate. As best seen in FIG. 3, the compression chamber 12 is generally rectangular in section, and is provided with hard metal wear plates 14, 16, 18 and 20 on its inner surface, which define the exact shape of the sides of a building block to be formed.

A ram 22 is fitted to the piston rod 24 of a hydraulic cylinder 26 which is supported by the frame 10 below the compression chamber 12, and is arranged to slide axially in the compression chamber from the lowermost end of the compression chamber to its uppermost end. At the upper end of the compression chamber is a sliding gate 28 of heavy steel plate which has an inner surface 30 defining the upper end wall of the compression chamber and which is retained by grooves or channels 32 and 34 in the metal body 12 of the compression chamber.

Figure 2:
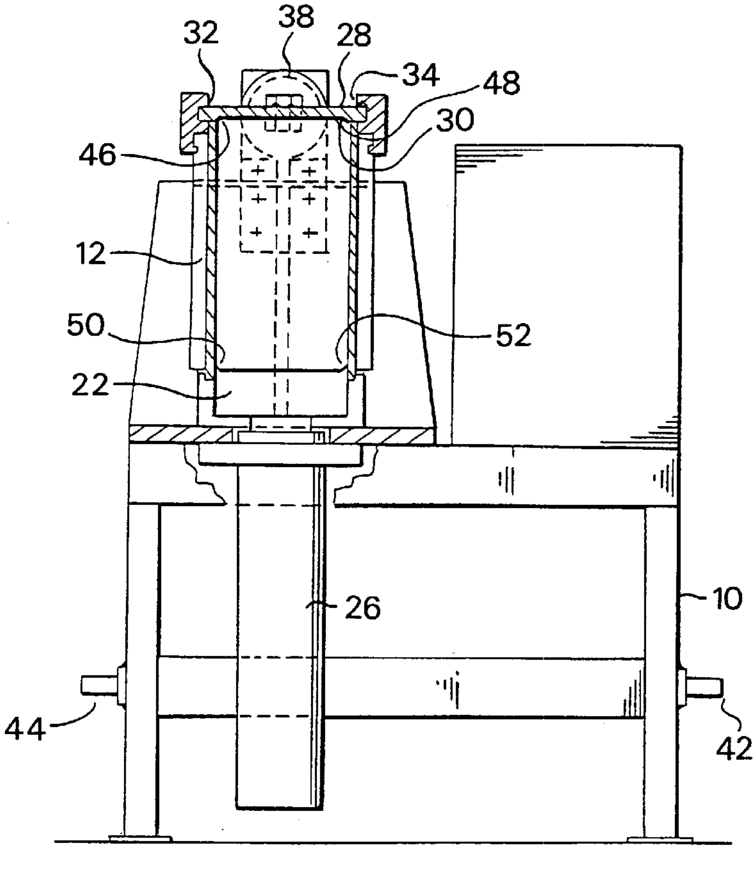
FIG. 2 is a partial sectional end view of the apparatus of FIG. 1.

As best seen in FIG. 2, the inner surface 30 of the sliding gate 28 has two opposed parallel inclined shoulders 46 and 48 at opposite sides thereof, which are designed to form a bevelled edge on a first end of the finished building block, rather than sharp rectangular corners. Similarly, the ram 22 has opposed parallel inclined shoulders 50 and 52 at its opposite edges, which from bevels in the edges of the other end of the finished building block. This is important to prevent crumbly edges in the finished block, due to a drop in the pressure distribution towards the edges of the block as it is being formed.

Figure 1:
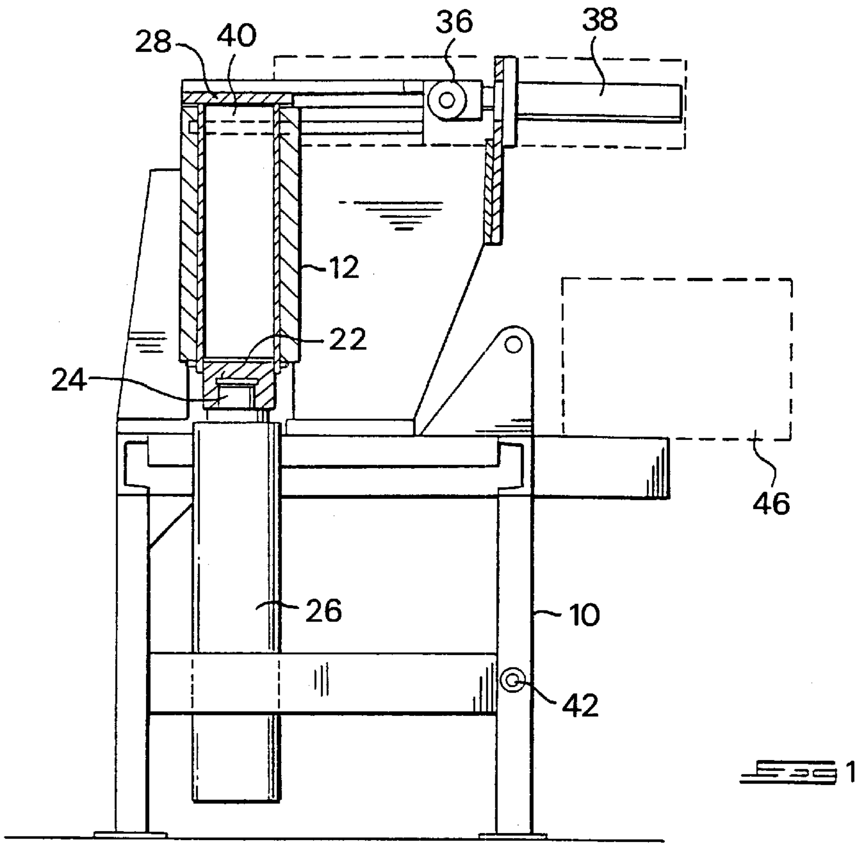
FIG. 1 is a partial sectional side view of apparatus for forming building blocks according to the invention.

The gate 28 is connected via a linkage 36 to a second, smaller hydraulic cylinder 38, which is operable to move the gate between the closed position shown in FIGS. 1 and 2, and an open position in which the interior of the compression chamber is exposed via an inlet/outlet 40.

In use, the ram 22 is retracted fully, as illustrated in FIGS. 1 and 2, and the gate 28 is slid open, exposing the interior of the compression chamber, allowing it to be filled with a soil/cement mixture or another suitable mixture for forming a building block. The gate is then closed by operation of the hydraulic cylinder 38, and the hydraulic cylinder 26 is then operated to force the ram 22 upwardly in the compression chamber, compressing the soil/cement mixture and forming a solid block.

Once the soil/cement mixture in the compression chamber has been pressurised to the required extent, the gate 28 is retracted rapidly while the hydraulic cylinder 26 is fully pressurised, so that the inner surface 30 of the gate 28 slides over the upper end of the block under pressure. This creates an "extrusion" effect, smoothing the upper end surface of the block. This is particularly important in the case of mixtures which are somewhat elastic (such as mixtures containing clay), which do not transmit the full pressure applied by the ram 20 uniformly throughout the soil/cement mixture. This can result in slightly soft and porous edges at the upper end of the block. However, by opening the gate 28 relatively rapidly while the newly formed block is under pressure applied by the ram 22, the resulting extrusion effect provides smooth edge surfaces at the upper end of the finished block.

The speed at which the gate 28 opens can be adjusted by means of a restriction valve in the hydraulic line (not shown) in the auxiliary hydraulic cylinder 38. This allows the speed of opening of the gate in be adjusted between approximately 0.1 m/s to approximately 1 m/s. Generally, the faster the speed of opening of the gate 28, the smoother will be the edges of the upper end of the finished block.

The characteristics of the finished block are, of course, influenced by the pressure applied by the ram 22. In a prototype apparatus, the ram and its associated hydraulic cylinder were selected to allow a maximum force of 50 tons to be exerted by the ram. A pressure release valve (not shown) is used to set an appropriate force/pressure setting for the mixture being used. The drier the mix, the greater is the pressure required to obtain satisfactory results.

Because the inlet/outlet 40 at the upper end at the compression chamber serves a duel purpose and is controlled by a single gate, only one further auxiliary hydraulic cylinder 38 is required in addition to the main hydraulic cylinder 26 for the ram 22. In addition, the fact that the compression chamber 12 is filled from the top ensures consistent filling of the compression chamber and effective distribution of the mixture therein, without the need for a sophisticated hopper or feeding system. This assists in loading consistent volumes of mix, with resulting consistent block size. Thus, the described apparatus operates efficiently and quickly, but is relatively simple to construct and therefore less expensive than other, more complicated apparatus of the same general type.

The frame 10 is provided with lifting pins 42 and 44 on its upright legs which enable the apparatus to be lifted by a hydraulic boom or other lifting apparatus on a tractor. This allows easy transporting of the apparatus. The frame can also be provided with wheels to allow easy transportation and towing thereof. In addition, the apparatus is preferably powered by a conventional power take-off of a tractor, with a hydraulic pump and a reduction gearbox (indicated schematically by the reference numeral 46) being mounted on the frame for this purpose. Alternatively, an electric motor or small engine can be mounted on the frame to drive the pump/gearbox 46.

I claim:

1. A method for compressing particulate material comprising:

delivering particulate material through an upper opening into a compression chamber;

closing a gate over the upper opening;

applying sufficient force to the particulate material to compress the material into a block within the compression chamber; and while maintaining the force against the particulate material, sliding the gate across an upper surface of the block to smooth said upper surface.

2. The method of claim 1 wherein the applying step is carried out by moving a ram from a retracted position near a lower opening in the compression chamber to an extended position towards the upper opening of the compression chamber.

3. The method of claim 2 wherein the opening step is carried out while the ram is in the extended position.

4. The method of claim 1 wherein the gate is slid at a rate of about 0.1 to 1.0 m/s.

5. The method of claim 1 wherein the sliding step is carried out by driving the gate with a hydraulic cylinder disposed adjacent to the upper end of the compression chamber.

6. The method of claim 1 wherein the gate comprises a plate having an inner surface defining an end wall and a compressing chamber, the plate being slid in grooves or channels at the upper end of the compression chamber.

7. The method of claim 6 further comprising supporting the compression chamber on a free standing frame.

* * * * *